United States Patent
Sao

(10) Patent No.: US 9,246,890 B2
(45) Date of Patent: Jan. 26, 2016

(54) PGP ENCRYPTED DATA TRANSFER

(71) Applicant: Oracle International Corporation, Redwood Shores, CA (US)

(72) Inventor: Saurav Sao, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 48 days.

(21) Appl. No.: 14/183,363

(22) Filed: Feb. 18, 2014

(65) Prior Publication Data

US 2015/0237016 A1 Aug. 20, 2015

(51) Int. Cl.
*H04L 29/06* (2006.01)
*H04L 9/06* (2006.01)

(52) U.S. Cl.
CPC ............ *H04L 63/045* (2013.01); *H04L 9/0643* (2013.01); *H04L 63/0428* (2013.01)

(58) Field of Classification Search
CPC .......................... H04L 63/045; H04L 63/0428
See application file for complete search history.

(56) References Cited

U.S. PATENT DOCUMENTS

| | | | |
|---|---|---|---|
| 6,185,681 B1* | 2/2001 | Zizzi .............................. | 713/165 |
| 6,874,139 B2* | 3/2005 | Krueger .............. | G06F 9/44521 713/165 |
| 6,981,141 B1* | 12/2005 | Mahne et al. ................. | 713/165 |
| 7,185,362 B2* | 2/2007 | Hawkes et al. .................... | 726/4 |
| 7,716,467 B1 | 5/2010 | Deffet | |
| 2004/0059912 A1* | 3/2004 | Zizzi .............................. | 713/165 |
| 2005/0229254 A1* | 10/2005 | Singh ...................... | G06F 21/55 726/23 |
| 2008/0040805 A1 | 2/2008 | Yasue | |
| 2008/0313613 A1* | 12/2008 | Bierhoff ................ | G06F 9/4428 717/116 |
| 2009/0228706 A1* | 9/2009 | Harris ................ | G06F 21/6218 713/167 |
| 2010/0095115 A1* | 4/2010 | Murray ............... | G06F 21/6227 713/165 |
| 2010/0299313 A1 | 11/2010 | Orsini | |
| 2010/0312800 A1* | 12/2010 | Lumb .................. | G06F 3/0608 707/796 |
| 2010/0313036 A1* | 12/2010 | Lumb .................. | G06F 21/602 713/189 |
| 2010/0313040 A1* | 12/2010 | Lumb .................. | G06F 3/0608 713/193 |
| 2012/0310901 A1* | 12/2012 | Matze .................. | G06F 3/0623 707/692 |

OTHER PUBLICATIONS

Cornerstone Managed File Transfer—Real-time PGP Encryption Module; obtained at http://www.webdrive.com/products/cornerstone/pgp.html; Sep. 19, 2013; 1 page.
Cornerstone MFT Server Features; obtained at http://southrivertechnologies.com/products/cornerstone/features.html; Sep. 19, 2013; 5 pages.
Cornerstone MFT; obtained at http://www.softkey.net/catalog/program.php?ID=129548; Sep. 19, 2013; 2 pages.
Cross-Platform Open PGP Encryption Tool Now Available from Linoma Software; obtained at http://www.prweb.com/releases/GoAnywhere/OpenPGP_Studio/prweb10566650.htm; Sep. 19, 2013; 2 pages.

(Continued)

*Primary Examiner* — Linglan Edwards
(74) *Attorney, Agent, or Firm* — Trellis IP Law Group, PC

(57) ABSTRACT

Example embodiments perform on-the-fly delivery of PGP encrypted data. A large data file is broken into chunks which are encrypted and delivered to a pipe object. The bytes of a chunk are read from the pipe object in the same order as they were written. Header and footer packets are prepared and delivered.

20 Claims, 5 Drawing Sheets

(56) References Cited

OTHER PUBLICATIONS

Open PGP Encryption Automation; obtained at http://www.goanywheremft.com/solutions/open-pgp-gpg-encryption; Sep. 19, 2013; 2 pages.

Symantec PGP encryption; obtained at http://www-935.ibm.com/services/sg/en/it-services/pgp-corporation-encryption-software-and-support.html; Sep. 19, 2013.

PGP Whole Disk Encryption; obtained at http://software.sites.unc.edu/software/pgp-whole-disk-encryption/; Sep. 19, 2013; 2 pages.

* cited by examiner

PGP ENCRYPTED DATA TRANSFER

BACKGROUND

Encrypted data transfer between computer processors via the internet is widely used to exchange sensitive data among enterprise partners and for other uses. Symmetric and asymmetric encryption techniques are both used.

Symmetric encryption techniques utilize a single encryption key value to both encrypt and decrypt data. Accordingly, both a sender and a receiver must have possession of the symmetric key to implement secure data delivery.

Asymmetric encryption techniques utilize a pair of key values called the private key and the public key. Each key in the pair can decrypt date encrypted by the other key in the pair. Typically the public key is distributed to intended receivers and the private key is kept in the possession of the sender.

All public key holders may decrypt a message encrypted by the sender using the private key. This assures the public key holder that only a person in possession of the private key could have encrypted the message. Further, the holders of public keys can use the public key to encrypt private messages that can only be decrypted using the private key.

Another use of asymmetric encryption is to digitally sign a document to assure the receiver that the data originated with the holder of the private key and has not been changed. The document is hashed into a small field of data called the message digest. The message digest is then encrypted with the private key into a signature for the data and sent along with the unencrypted document to the receiver. The receiver uses the public key to decrypt the signature to obtain the message digest thereby assuring that the message was sent by the holder of the private key. The receiver then hashes the received unencrypted document into a message digest. If the two message digests are the same then the data has not been changed.

Encryption using a symmetric algorithm is faster than using an asymmetric algorithm. However, a major problem is distribution of the single symmetric key value to multiple parties. Using an asymmetric encryption scheme greatly reduces the number of keys required and the problem of key distribution.

PGP (Pretty Good Protection) is a hybrid symmetric/asymmetric technique that eliminates the problems and utilizes the benefits of both systems. In PGP a symmetric PGP session key is generated that will be used only for the current session. The PGP session key is a random number generated by a processor in response to user input such as mouse movements or keystrokes.

The sender and receiver use a pair of PGP asymmetric public/private encryption keys to encrypt and decrypt the symmetric PGP session key. At the sender, the symmetric PGP session key is encrypted using the PGP asymmetric public key and transmitted to the receiver in a PGP header packet. The message text is then encrypted using the session key and stored in I/O memory as encrypted text. The encrypted text is then transmitted to the receiver.

At the receiver, the encrypted text is stored in I/O memory. The encrypted symmetric PGP session key is decrypted using the PGP asymmetric private key. The decrypted PGP session key is then used to decrypt the encrypted text stored in I/O memory.

SUMMARY

Example embodiments perform on-the-fly delivery of PGP encrypted data. A large data file is broken into chunks which are encrypted and delivered to a pipe object. The bytes of a chunk are read from the pipe object in the same order as they were written. Header and footer packets are prepared and delivered.

In another example embodiment, a sending processing system for PGP encrypting a data file to form a PGP-encrypted data file and for on-the-fly delivering of the PGP-encrypted data file to a receiving processing system, where the sending and receiving processing systems are coupled to a network, the sending processing system includes one or more processors, a transport sender initialized to open a socket channel between the sending and receiving processing systems and configured to send data from the sending processing system to the receiving processing system, a PGP encrypter configured to symmetrically encrypt data using a symmetric PGP session key, a storage unit storing a file to be encrypted, logic encoded in one or more non-transitory computer readable storage media for execution by the one or more processors and with the one or more processors, when executing the logic, performing the acts of defining a hash variable holding a message digest/hash value, initializing a pipe object with a source channel assigned to an input stream of the transport sender and a sink channel assigned as an output stream of the PGP encrypter, generating a PGP header packet including an asymmetrically encrypted PGP session key, with the PGP session key encrypted using the public key of a PGP asymmetric public key/private key pair, sending the PGP header packet to the sink channel of the pipe, where the PGP header packet is sent by the transport sender to the receiving processing system, computing an initial message digest/hash value equal to the hash value of the PGP header packet, encrypting a first chunk of the data file with the PGP encrypter to form a first encrypted data file chunk, sending the first encrypted data file chunk to the sink channel of the pipe, where the first encrypted data file chunk is sent by the transport sender to the receiving processing system, recomputing the message digest/hash value based on bytes of the first encrypted data file chunk and a previously generated message digest/hash value, if all data in the data file has not been encrypted, encrypting a next chunk of the data file with the PGP encrypter to form a next encrypted data file chunk, sending the next encrypted data file chunk to the sink channel of the pipe, where the next encrypted data file chunk is sent by the transport sender to the receiving processing system, recomputing the message digest/hash value based on bytes of the next encrypted data file chunk and a previously generated message digest/hash value, if all data in the data file has been encrypted, generating a PGP footer file including a last recomputed message digest hash value and sending the next encrypted data file chunk to the sink channel of the pipe, where the PGP footer file is sent by the transport sender to the receiving processing system.

A further understanding of the nature and the advantages of particular embodiments disclosed herein may be realized by reference of the remaining portions to the specification and the attached drawings.

DETAILED DESCRIPTION OF EMBODIMENTS

Although particular embodiments have been described, these particular embodiments are merely illustrative, and not restrictive.

As described above, standard techniques for sending PGP encrypted data require two steps. The first step is to encrypt the data using a PGP encryption algorithm and write the encrypted data in some I/O storage system, such in file system or memory. The second step is to read the encrypted data from the I/O storage system and send the encrypted data to the receiver.

Embodiments will now be described for delivering PGP-encrypted data on the fly. The requirement of using I/O storage for a large encrypted data file prior to delivery is eliminated. As described more fully below, a large data file (e.g., 1 Gigabyte) may be encrypted by being broken into data chunks where each data chunk is PGP-encrypted and then sent to the receiver. Unlike other encryption techniques, PGP adds certain headers, footers and optional signatures to the data which make it difficult to do on-the-fly data delivery.

In an example embodiment, each encrypted data chunk is sent to the receiver using a pipe. Once the pipe is cleared the next encrypted data chunk is sent. Thus, redundant read and write operations to I/O are eliminated. Because I/O operations are the most expensive operations for software, the elimination of the redundant read and write operations to I/O significantly improves performance.

Figure 1:
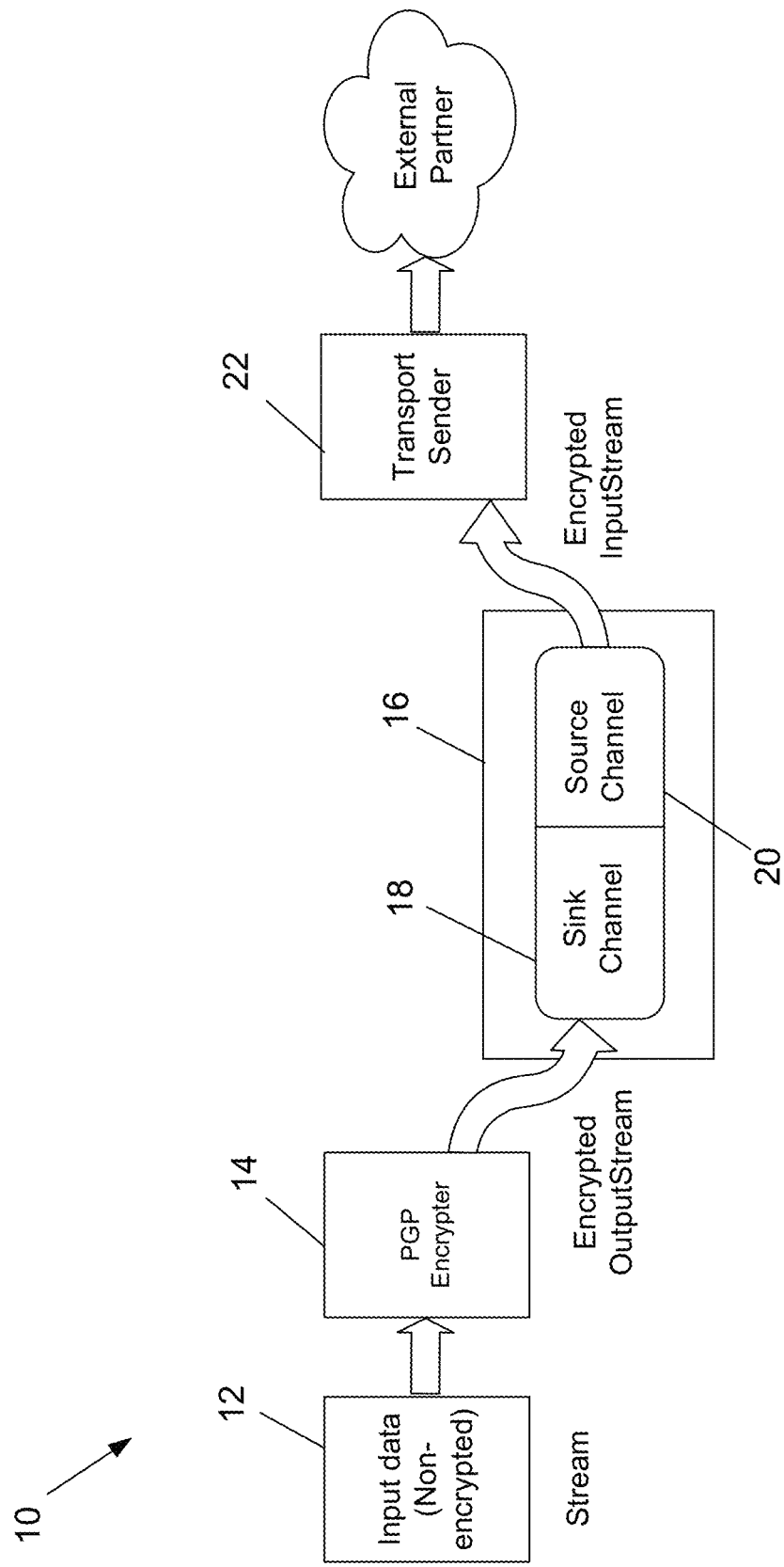
FIG. 1 is a high level block diagram illustrating an example embodiment.

FIG. 1 is a high-level schematic diagram of an example embodiment of software modules implemented on the sender, for example an enterprise computer environment 10. A computing environment may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on. The details of a computer environment will be described below.

Input unencrypted data 12 may be in the form of file labeled file.txt. This file is encrypted using PGP encrypter 14, for example, an open source application programming interface (API) for PGP encryption. A pipe object 16 includes a sink channel 18 and a source channel 20. The sink channel 18 is coupled to receive an encrypted output stream from the PGP encrypter 14. The source channel 20 is coupled to provide an encrypted input stream to the input of a transport sender 22 such as, for example, a file transport protocol (FTP) adapter. The output of the transport sender 22 is coupled to a network to transmit the PGP-encrypted data to an external partner using a standard network protocol such as FTP or secure FTP (SFTP).

Figure 2:
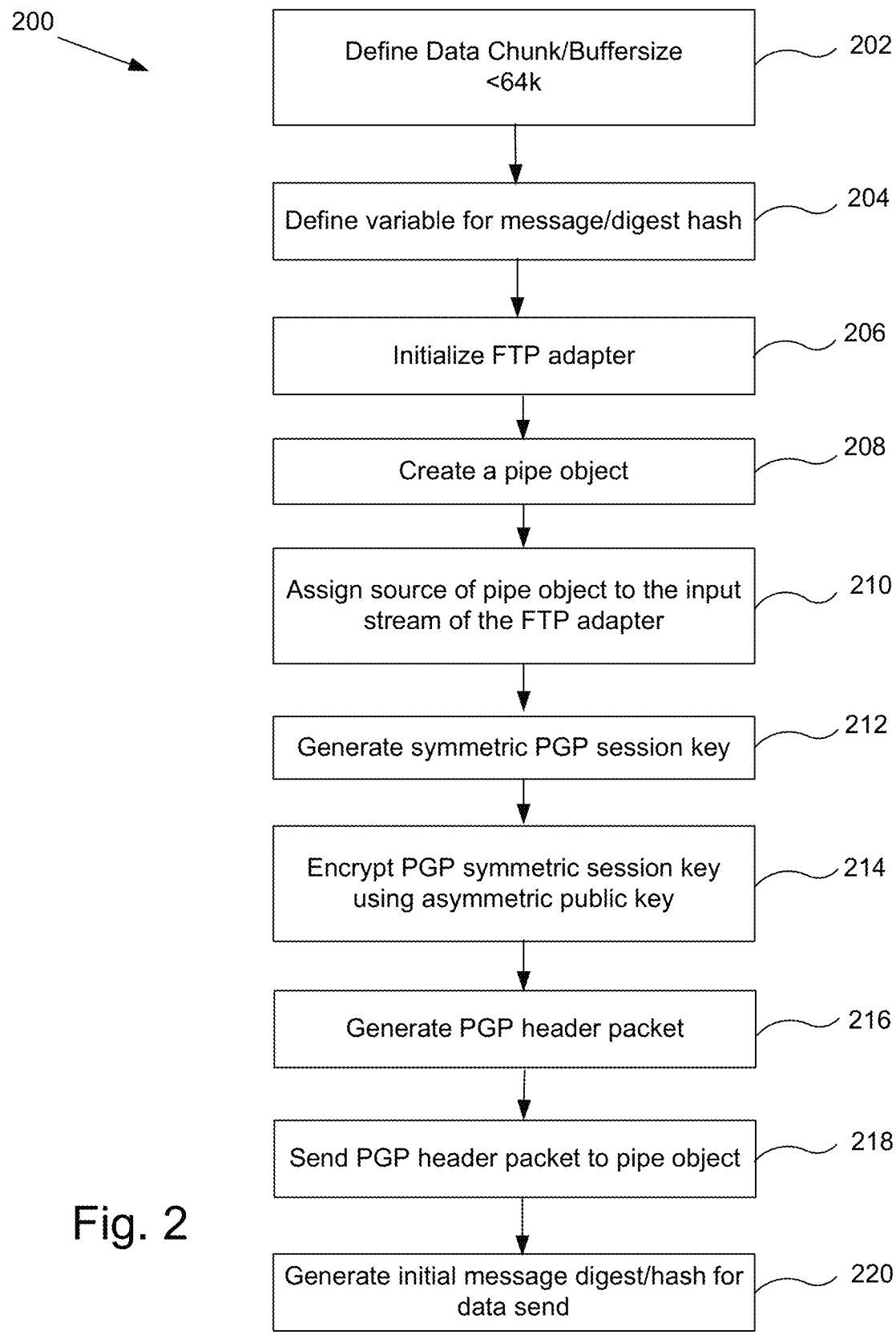
FIG. 2 is a flow chart illustrating an example of process steps performed at the sender to set up on-the-fly PGP encrypted data delivery.

FIG. 2 is a flow chart 200 illustrating the steps performed at the sender to set up on-the-fly PGP encrypted data delivery of a file name, in this example, file.txt. In this example the sender wants to upload a large 1 GB file to the receiver. The receiver wants only the PGP encrypted file to be uploaded to its FTP server.

In process step 202 a buffer size for a data chunk is defined. The absolute upper limitation for packet size in TCP is 64 KB (65,535 bytes). The buffer in this embodiment is the buffer used in the pipe object to implement the sink and source channels.

In process step 204 a variable is defined for the message digest hash value. For example, the following statement defines the variable: var hash=hashfunction(bytes sent) where the hashfunction is a cryptographic hash function such as SHA-1 and where bytes sent are the bytes included in an encrypted data chunk.

In process step 206 the FTP adapter is initialized. The FTP adapter client at the sender opens a socket channel to connect to the FTP adapter server at the receiver. The FTP adapter client also creates an empty file with name file.txt.pgp at the FTP adapter server. An example FTP client is available in the Oracle Business Process Execution Language (BPEL) process manager.

In process step 208 a pipe object is created. For example, in the JAVA programming language the java.nio.channels.Pipe class is used for pipe implementation. The pipe class includes a writable sink channel and a readable source channel. Bytes written to the sink channel can be read from the source channel in exactly the order in which they were written.

In process step 210 the source channel of the pipe object is assigned to the input stream of the FTP adapter.

In process step 212 the symmetric PGP session key is generated at the sender. In PGP this session key is a random number generated from user input such as mouse movements or keystrokes.

In process step 214 the symmetric PGP session key is encrypted using the PGP public asymmetric key of the PGP asymmetric public/private key pair. This PGP asymmetric key pair has been set up prior to the session and is used by the sender/receiver pair to implement PGP uploads from the sender to the receiver.

In process step 216 a PGP header packet is generated that includes the encrypted PGP session key and in process step 218 the PGP header packet is sent to the sink channel of the pipe object. As soon as the PGP header packet is sent to the sink channel it is transmitted over the socket channel to file.txt.pgp by the FTP adapter client.

In process step 220 an initial value of a message digest/hash is set equal to the hash variable equal to hashfunction (bytes sent in header packet). The initial value of the message digest/hash is stored in java memory at the sender.

Figure 3:
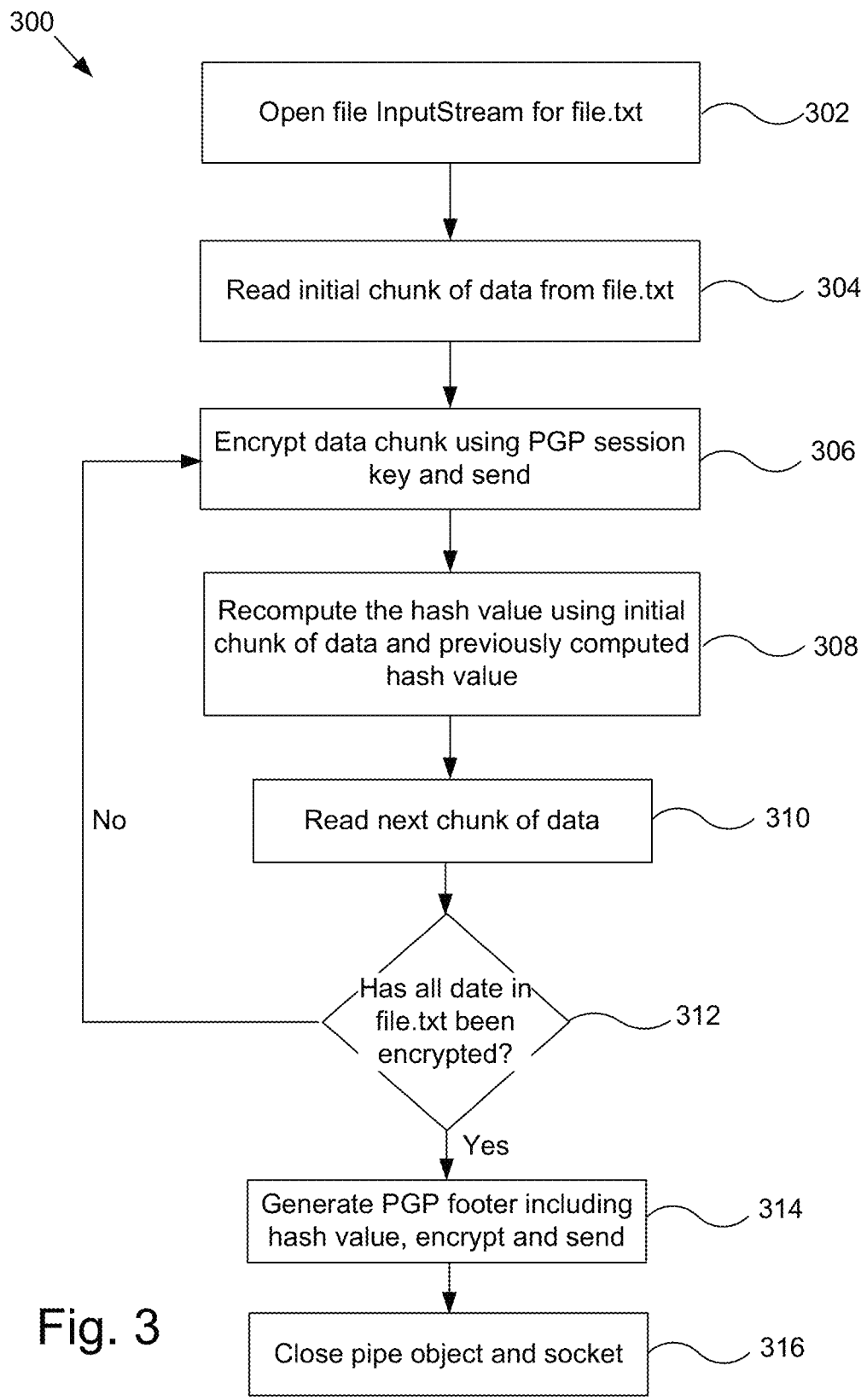
FIG. 3 is a flow chart illustrating an example of process steps performed at the sender for encrypting and sending each chunk of data.

Subsequent to initialization the data file is encrypted in chunks and sent to the receiver one encrypted chunk at a time. The steps performed at the sender for encrypting and sending each chunk of data are depicted in the flow chart 300 of FIG. 3.

At process step 302 the fileInputStream object is opened for file.txt.

At process step 304 an initial chunk of the data in file.txt, for example 64 KB, is read and in process step 306 is encrypted using the symmetric PGP session key and sent to file.txt.pgp at the receiver.

In process step 308, the message digest/hash value is recomputed as an incrementing process using the previously computed hash value and the presently encrypted chunk of data. For example, the following statement defines the recomputed message digest/hash value: hash=recomputeHash (hashfunction(bytes sent, hash).

In process step 310 the next chunk of data is read from file.txt.

In process step 312 it is determined if all the data file.txt has been encrypted. If NO, then process steps 306-312 are repeated. If YES, then proceed to process step 314.

In process step 314 the final incremental message digest/hash value is computed and included in a PGP footer packet. The PGP footer packet is encrypted using the PGP public asymmetric key and sent to the receiver.

In process step 316 the pipe object and socket connections are closed and the session is ended.

Figure 4:
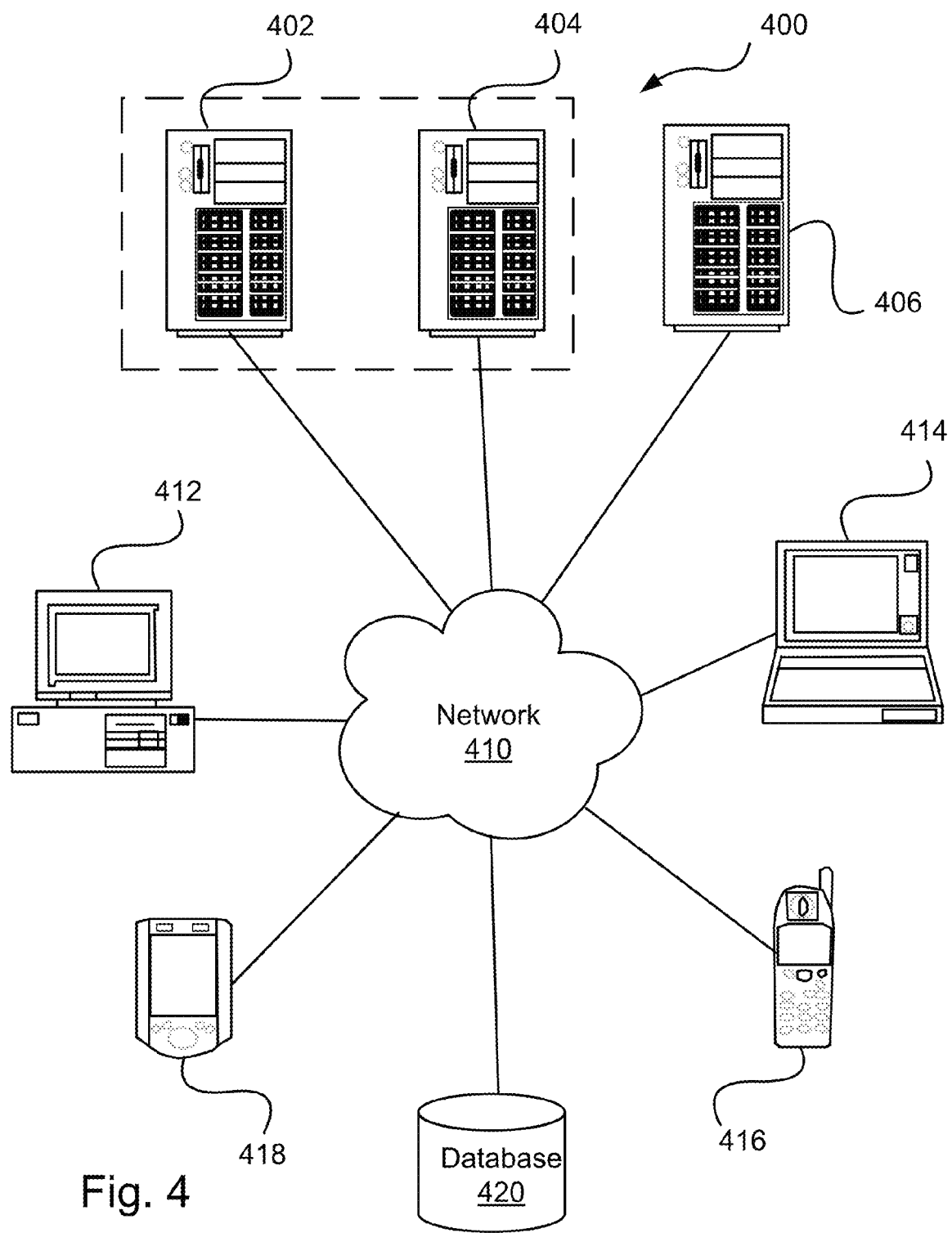
FIG. 4 is a block diagram illustrating components of an example operating environment in which various embodiments of the present invention may be implemented.

FIG. 4 is a block diagram illustrating components of an example operating environment in which various example embodiments may be implemented. The system 400 can include one or more user computers, computing devices, or processing devices 412, 414, 416, 418, which can be used to operate a client, such as a dedicated application, web browser, etc. The user computers 412, 414, 416, 418 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 412, 414, 416, 418 may also have any of a variety of applications, including one or more development systems, database client and/or server applications, and Web browser applications. Alternatively, the user computers 412, 414, 416, 418 may be any other electronic device, such as a thin-client computer, Internet-enabled gaming system, and/or personal messaging device, capable of communicating via a network (e.g., the network 410 described below) and/or displaying and navigating Web pages or other types of electronic documents. Although the example system 400 is shown with four user computers, any number of user computers may be supported.

In most embodiments, the system 400 includes some type of network 410. The network may be any type of network familiar to those skilled in the art that can support data communications using any of a variety of commercially-available protocols, including without limitation TCP/IP, SNA, IPX, AppleTalk, and the like. Merely by way of example, the network 410 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 402, 404, 406 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 406) may be dedicated to running applications, such as a business application, a Web server, application server, etc. Such servers may be used to process requests from user computers 412, 414, 416, 418. The applications can also include any number of applications for controlling access to resources of the servers 402, 404, 406.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 412, 414, 416, 418. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 412, 414, 416, 418.

The system 400 may also include one or more databases 420. The database(s) 420 may reside in a variety of locations. By way of example, a database 420 may reside on a storage medium local to (and/or resident in) one or more of the computers 402, 404, 406, 412, 414, 416, 418. Alternatively, it may be remote from any or all of the computers 402, 404, 406, 412, 414, 416, 418, and/or in communication (e.g., via the network 410) with one or more of these. In a particular set of embodiments, the database 420 may reside in a storage-area network ("SAN") familiar to those skilled in the art. Similarly, any necessary files for performing the functions attributed to the computers 402, 404, 406, 412, 414, 416, 418 may be stored locally on the respective computer and/or remotely, as appropriate. In one set of embodiments, the database 420 may be a relational database, such as Oracle 10g, that is adapted to store, update, and retrieve data in response to SQL-formatted commands.

Figure 5:
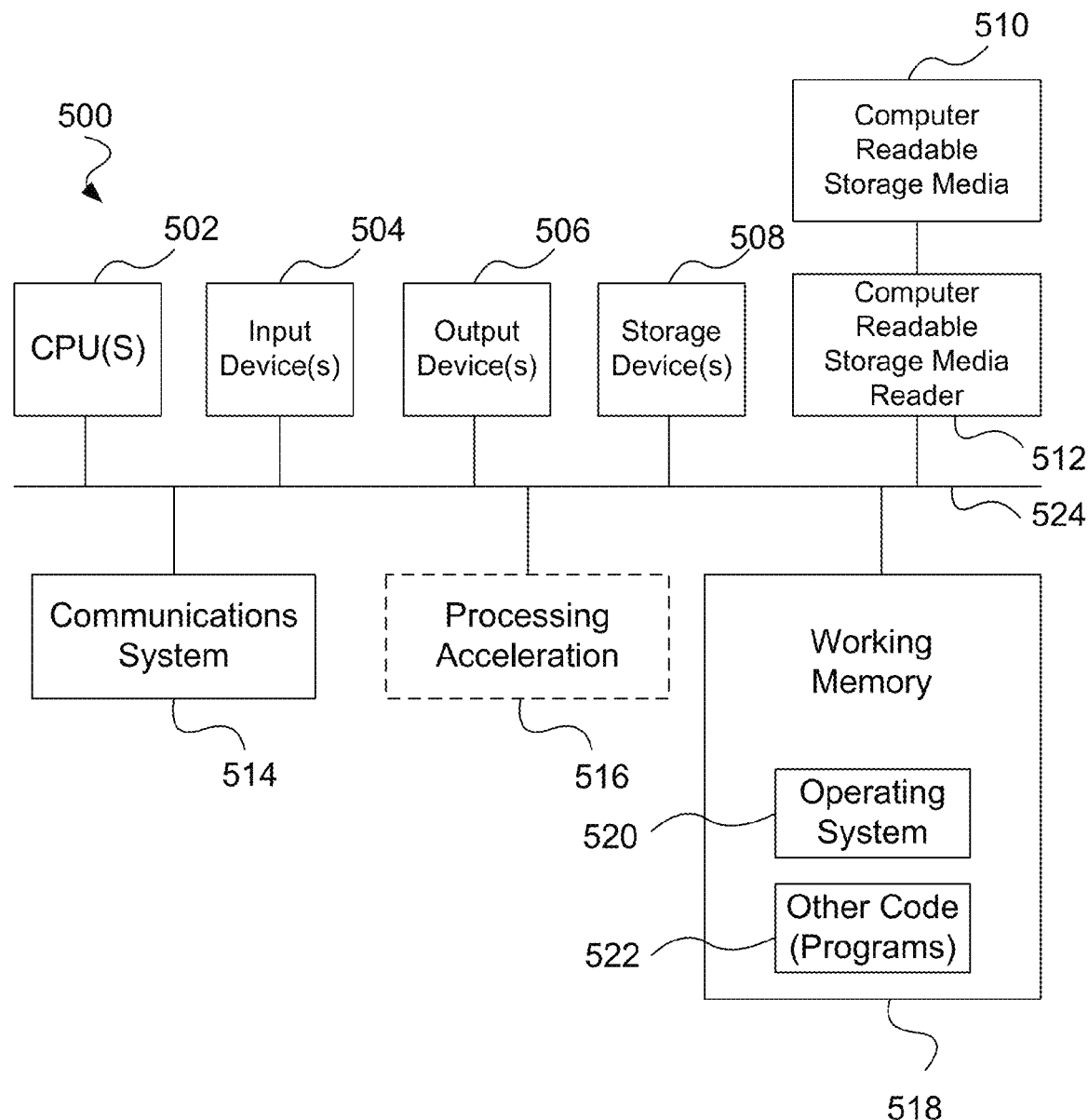
FIG. 5 illustrates an example computer system in which various embodiments of the present invention may be implemented.

FIG. 5 illustrates an example computer system 500, in which various example embodiments may be implemented. The system 500 may be used to implement any of the computer systems described above. The computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). The computer system 500 may also include one or more storage devices 508. By way of example, the storage device(s) 508 can include devices such as disk drives, optical storage devices, solid-state storage devices such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor DSP, a special-purpose processor, and/or the like.

The computer-readable storage media reader 512 can further be connected to a computer-readable storage medium 510, together (and, optionally, in combination with storage device(s) 508) comprehensively representing remote, local, fixed, and/or removable storage devices plus storage media for temporarily and/or more permanently containing computer-readable information. The communications system 514 may permit data to be exchanged with the network and/or any other computer described above with respect to the system 500.

The computer system 500 may also comprise software elements, shown as being currently located within a working memory 518, including an operating system 520 and/or other code 522, such as an application program (which may be a client application, Web browser, mid-tier application, RDBMS, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices and field programmable gate arrays. Optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine readable medium to permit a computer to perform any of the methods described above.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material within the essential scope and spirit.

I claim:

1. A sending processing system for Pretty Good Protection (PGP) encrypting a data file to form a PGP-encrypted data file and for on-the-fly delivering of the PGP-encrypted data file to a receiving processing system, where the sending and receiving processing systems are coupled to a network, the sending processing system comprising:

one or more processors;

a transport sender initialized to open a socket channel between the sending and receiving processing systems and configured to send data from the sending processing system to the receiving processing system;

a PGP encrypter configured to symmetrically encrypt data using a symmetric PGP session key;

a storage unit storing a file to be encrypted;

logic encoded in one or more non-transitory computer readable storage media for execution by the one or more processors and with the one or more processors, when executing the logic, performing the acts of:

defining a hash variable holding a message digest/hash value;

initializing a pipe object with a source channel assigned to an input stream of the transport sender and a sink channel assigned as an output stream of the PGP encrypter;

generating a PGP header packet including an asymmetrically encrypted PGP session key, with the PGP session key encrypted using the public key of a PGP asymmetric public key/private key pair;

sending the PGP header packet to the sink channel of the pipe, where the PGP header packet is sent by the transport sender to the receiving processing system;

computing an initial message digest/hash value equal to the hash value of the PGP header packet;

encrypting a first chunk of the data file with the PGP encrypter to form a first encrypted data file chunk;

sending the first encrypted data file chunk to the sink channel of the pipe, where the first encrypted data file chunk is sent by the transport sender to the receiving processing system;

recomputing the message digest/hash value based on bytes of the first encrypted data file chunk and a previously generated message digest/hash value;

if all data in the data file has not been encrypted, encrypting a next chunk of the data file with the PGP encrypter to form a next encrypted data file chunk;

sending the next encrypted data file chunk to the sink channel of the pipe, where the next encrypted data file chunk is sent by the transport sender to the receiving processing system;

recomputing the message digest/hash value based on bytes of the next encrypted data file chunk and a previously generated message digest/hash value;

if all data in the data file has been encrypted, generating a PGP footer packet including a last recomputed message digest hash value; and sending the PGP footer packet to the sink channel of the pipe, where the PGP footer packet is sent by the transport sender to the receiving processing system.

2. The sending processing system of claim 1 where the PGP encrypter is an open source application programming interface for performing PGP encryption.

3. The sending processing system of claim 1 where the pipe object is a java pipe object.

4. The sending processing system of claim 1 where a chunk of the data file includes 64 KB of data.

5. The sending processing system of claim 1 where the transport sender is a File Transfer Protocol (FTP) client.

6. The sending processing system of claim 5 where the FTP client is a java FTP client.

7. The sending processing system of claim 1 where the message digest/hash value is computed using an SHA-1 hashing algorithm.

8. The method of claim 1 where computing the message digest/hash value includes computing the message digest/hash value using an SHA-1 hashing algorithm.

9. One or more non-transitory computer readable storage media storing program code for execution by one or more processors included in a sending processing system for Pretty Good Protection (PGP) encrypting a data file to form a PGP-encrypted data file and for on-the-fly delivering of the PGP-encrypted data file to a receiving processing system, where the sending and receiving processing systems are coupled to a network, the sending processing system further comprising a transport sender initialized to open a socket channel between the sending and receiving processing systems and configured to send data from the sending processing system to the receiving processing system, a PGP encrypter configured to symmetrically encrypt data using a symmetric PGP session key and a storage unit storing a file to be encrypted, where the program code, when executed by the one or more processors performs the following acts:

defining a hash variable holding a message digest/hash value;

initializing a pipe object with a source channel assigned to an input stream of the transport sender and a sink channel assigned as an output stream of the PGP encrypter;

generating a PGP header packet including an asymmetrically encrypted PGP session key, with the PGP session key encrypted using the public key of a PGP asymmetric public key/private key pair;

sending the PGP header packet to the sink channel of the pipe, where the PGP header packet is sent by the transport sender to the receiving processing system;

computing an initial message digest/hash value equal to the hash value of the PGP header packet;

encrypting a first chunk of the data file with the PGP encrypter to form a first encrypted data file chunk;

sending the first encrypted data file chunk to the sink channel of the pipe, where the first encrypted data file chunk is sent by the transport sender to the receiving processing system;

recomputing the message digest/hash value based on bytes of the first encrypted data file chunk and a previously generated message digest/hash value;

if all data in the data file has not been encrypted, encrypting a next chunk of the data file with the PGP encrypter to form a next encrypted data file chunk;

sending the next encrypted data file chunk to the sink channel of the pipe, where the next encrypted data file chunk is sent by the transport sender to the receiving processing system;

recomputing the message digest/hash value based on bytes of the next encrypted data file chunk and a previously generated message digest/hash value;

if all data in the data file has been encrypted, generating a PGP footer packet including a last recomputed message digest hash value; and sending the PGP footer packet to the sink channel of the pipe, where the PGP footer packet is sent by the transport sender to the receiving processing system.

10. The one or more non-transitory computer readable storage media of claim 9 where the PGP encrypter included in the sending processing system is an open source application programming interface for performing PGP encryption.

11. The one or more non-transitory computer readable storage media of claim 9 where initializing the pipe object includes initializing a java pipe object.

12. The one or more non-transitory computer readable storage media of claim 9 where sending a chunk of data includes sending a chunk of the data file including 64 KB of data.

13. The one or more non-transitory computer readable storage media of claim 9 where the transport sender included in the sending processing system is a File Transfer Protocol (FTP) client.

14. The one or more non-transitory computer readable storage media of claim 9 where the FTP client is a java FTP client.

15. The one or more non-transitory computer readable storage media of claim 9 where computing the message digest/hash value includes computing the message digest/hash value using an SHA-1 hashing algorithm.

16. A method performed by a one or more processors in a sending processing system for Pretty Good Protection (PGP) encrypting a data file to form a PGP-encrypted data file and for on-the-fly delivering of the PGP-encrypted data file to a receiving processing system, where the sending and receiving processing systems are coupled to a network, with the sending processing system further including a transport sender initialized to open a socket channel between the sending and receiving processing systems and configured to send data from the sending processing system to the receiving processing system, a PGP encrypter configured to symmetrically encrypt data using a symmetric PGP session key and a storage unit storing a file to be encrypted, the method comprising:

defining a hash variable holding a message digest/hash value;

initializing a pipe object with a source channel assigned to an input stream of the transport sender and a sink channel assigned as an output stream of the PGP encrypter;

generating a PGP header packet including an asymmetrically encrypted PGP session key, with the PGP session key encrypted using the public key of a PGP asymmetric public key/private key pair;

sending the PGP header packet to the sink channel of the pipe, where the PGP header packet is sent by the transport sender to the receiving processing system;

computing an initial message digest/hash value equal to the hash value of the PGP header packet;

encrypting a first chunk of the data file with the PGP encrypter to form a first encrypted data file chunk;

sending the first encrypted data file chunk to the sink channel of the pipe, where the first encrypted data file chunk is sent by the transport sender to the receiving processing system;

recomputing the message digest/hash value based on bytes of the first encrypted data file chunk and a previously generated message digest/hash value;

if all data in the data file has not been encrypted, encrypting a next chunk of the data file with the PGP encrypter to form a next encrypted data file chunk;

sending the next encrypted data file chunk to the sink channel of the pipe, where the next encrypted data file chunk is sent by the transport sender to the receiving processing system;

recomputing the message digest/hash value based on bytes of the next encrypted data file chunk and a previously generated message digest/hash value;

if all data in the data file has been encrypted, generating a PGP footer packet including a last recomputed message digest hash value; and sending the PGP footer packet to the sink channel of the pipe, where the PGP footer packet is sent by the transport sender to the receiving processing system.

17. The method of claim 16 where the PGP encrypter is an open source application programming interface for performing PGP encryption.

18. The method of claim 16 where initializing the pipe object includes initializing a java pipe object.

19. The method of claim 16 where sending a chunk of data includes sending a chunk of the data file including 64 KB of data.

20. The method of claim 16 where the transport sender is a Java File Transfer Protocol (FTP) client.

* * * * *